US011518266B2

(12) United States Patent
Logvinov et al.

(10) Patent No.: US 11,518,266 B2
(45) Date of Patent: Dec. 6, 2022

(54) METHOD AND APPARATUS FOR CONTROLLING CHARGING, BASED ON MONITORED COMMUNICATION SIGNALS ASSOCIATED WITH A CHARGING SESSION

(71) Applicant: IoTecha Corp., Cranbury, NJ (US)

(72) Inventors: Oleg Logvinov, Weston, CT (US); Michael J. Macaluso, Jackson, NJ (US)

(73) Assignee: IoTecha Corp., Cranbury, NJ (US)

( * ) Notice: Subject to any disclaimer, the term of this patent is extended or adjusted under 35 U.S.C. 154(b) by 7 days.

(21) Appl. No.: 16/973,874

(22) PCT Filed: Jun. 12, 2019

(86) PCT No.: PCT/US2019/036777
§ 371 (c)(1),
(2) Date: Dec. 10, 2020

(87) PCT Pub. No.: WO2019/241395
PCT Pub. Date: Dec. 19, 2019

(65) Prior Publication Data
US 2021/0276446 A1    Sep. 9, 2021

Related U.S. Application Data (60) Provisional application No. 62/684,409, filed on Jun. 13, 2018.

(51) Int. Cl.
*B60L 53/66*    (2019.01)
*H02J 7/00*    (2006.01)
(Continued)

(52) U.S. Cl.
CPC .............. *B60L 53/66* (2019.02); *B60L 53/305* (2019.02); *B60L 53/60* (2019.02); *B60L 53/62* (2019.02);
(Continued)

(58) Field of Classification Search
CPC ........ B60L 53/66; B60L 53/305; B60L 53/60; B60L 53/62; H02J 7/00032; H02J 7/0047; H02J 7/007188; H04B 3/542
(Continued)

(56) References Cited

U.S. PATENT DOCUMENTS 8,655,553 B2 * 2/2014 Nojima .................. B60L 53/65
363/175
9,020,771 B1 * 4/2015 Hardy .................. B60L 3/0069
702/65
(Continued)

OTHER PUBLICATIONS

International Search Report including Written Opinion for Application No. PCT/US2019/036777, dated Sep. 4, 2019, pp. 1-11.

*Primary Examiner* — Richard Isla
*Assistant Examiner* — Manuel Hernandez
(74) *Attorney, Agent, or Firm* — NK Patent Law (57) ABSTRACT

Controlling electric vehicle (EV) charging operation by controlling capturing, from a pilot line communicatively linking an EV with an EV charging apparatus, at least one signal of a pulse width modulated (PWM) signal or power line communication (PLC) signal indicating EV charging session information associated with charging the EV by the charging apparatus; determining, from session success information from a controller of the charging apparatus, whether to analyze the EV charging session information; and when the session success information is determined to not indicate successful completion of an EV charging session, extracting the EV charging session information from the at least one signal according to Internet protocol layer, and analyzing the extracted EV charging session information to determine a marginal operating condition or a failure condition associated with an EV charging session.

14 Claims, 4 Drawing Sheets

(51) Int. Cl.
    *H04B 3/54*    (2006.01)
    *B60L 53/30*   (2019.01)
    *B60L 53/62*   (2019.01)
    *B60L 53/60*   (2019.01)

(52) U.S. Cl.
    CPC ........ *H02J 7/00032* (2020.01); *H02J 7/0047* (2013.01); *H04B 3/542* (2013.01); *H02J 7/007188* (2020.01)

(58) Field of Classification Search
    USPC .......................................................... 320/109
    See application file for complete search history.

(56) References Cited

U.S. PATENT DOCUMENTS

| | | | |
|---|---|---|---|
| 9,290,104 B2* | 3/2016 | Gadh | B60L 53/60 |
| 2010/0299008 A1 | 11/2010 | Mitsutani | |
| 2012/0116745 A1 | 5/2012 | Dickinson et al. | |
| 2012/0139489 A1 | 6/2012 | Gaul et al. | |
| 2013/0116886 A1* | 5/2013 | Nojima | B60L 53/65 |
| | | | 903/903 |
| 2013/0219084 A1* | 8/2013 | Wu | G06F 3/00 |
| | | | 710/11 |
| 2013/0300429 A1 | 11/2013 | Jefferies et al. | |
| 2014/0036989 A1 | 2/2014 | Heinrich et al. | |
| 2015/0346288 A1* | 12/2015 | Hardy | G06Q 30/04 |
| | | | 702/58 |
| 2018/0183243 A1* | 6/2018 | Lachman | H02J 7/007 |
| 2020/0104948 A1* | 4/2020 | Forbes, Jr. | G05D 17/00 |

* cited by examiner

METHOD AND APPARATUS FOR CONTROLLING CHARGING, BASED ON MONITORED COMMUNICATION SIGNALS ASSOCIATED WITH A CHARGING SESSION

CROSS-REFERENCE TO RELATED APPLICATION

The present application is a national phase entry under 35 U.S.C. § 371 of International Application No. PCT/US2019/036777 filed Jun. 12, 2019, published in English, which claims priority from U.S. Provisional Application No. 62/684,409, filed on Jun. 13, 2018, all of which are incorporated herein by reference.

BACKGROUND

With the rollout of Electric Vehicle (EV) charging stations and new EVs by multiple vendors, concerns related to industry wide interoperability for charging EVs exist. Seamless and error free EV charging is desirable to provide customer satisfaction and continue the growth of EV adoption. Although various certification plans are being developed to insure EV charging interoperability on a worldwide basis, there still remains a need to address EV charging interoperability issues that may arise in real field deployments.

SUMMARY

In accordance with aspect of the present disclosure, a method for controlling EV charging operation may include controlling, by a processing device, monitoring EV charging related communication signals at a physical layer during an EV charging session, and optionally monitoring sensor information associated with or related to EV charging operations from sensors which are external to an EV charging apparatus during the charging session; analyzing EV charging related information extracted from the monitored signals, and optionally also analyzing the sensor information, to determine circumstances of a marginal operation condition or a failure condition during an EV charging session; and generating and providing an output, where the output is based on a result of the analyzing, to a EV charging related device, such as an EV charging apparatus or an EV to be charged, to cause a change in EV charging operations at the EV charging related device during a given EV charging session.

In accordance with aspect of the present disclosure, a method for controlling electric vehicle (EV) charging operation may include controlling, by a processing device, capturing, from a pilot line communicatively linking a given EV with an EV charging apparatus, at least one signal of a pulse width modulated (PWM) signal or power line communication (PLC) signal indicating EV charging session information associated with charging the given EV by the EV charging apparatus; determining, from session success information from a controller of the EV charging apparatus, whether to analyze the EV charging session information; and when the session success information is determined to not indicate successful completion of an EV charging session, extracting the EV charging session information from the at least one signal according to Internet protocol layer, and analyzing the extracted EV charging session information to determine a marginal operating condition or a failure condition associated with an EV charging session.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

DETAILED DESCRIPTION

The technology of the present disclosure relates to, by way of example, EV charging operations for charging a battery of an EV by an EV charging apparatus, and in particular analyzing EV charging session information obtained from signals, which are on a pilot communication line ("pilot line") interconnecting a controller of the EV charging apparatus and the EV and which are passively monitored during an EV charging session, to identify a cause of a marginal operating condition or a failure condition during an EV charging session. The analyzing may optionally include analyzing sensor information from sensors, which are external to the EV charging apparatus and may generate sensor information associated with or useful for controlling EV charging operations.

In one embodiment, a Protocol Analysis Block controller ("analysis controller") may control passively capturing pulse width modulated (PWM) signals or power line communication (PLC) signals on the pilot line, in other words, at a physical layer of a communication network, during an EV charging session, and analyzing EV charging session information extracted from the monitored signals, to identify a cause of a marginal operating condition or a failure condition during an EV charging session. In a further embodiment, the analyzing of the EV charging session information from the monitored signals may be performed based on whether the EV charging apparatus provides an indication that an EV charging session is successful.

In the present disclosure below, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with EV charging and an EV charging system have not been shown or described in detail to avoid unnecessarily obscuring descriptions of the embodiments.

Embodiments of the present disclosure are described generally with respect to as analysis controller, which may be employed in various settings for charging batteries of respective EVs. Although the present disclosure uses EV battery charging for an automobile as an example of charging an EV, it is to be understood that the aspects of the present disclosure may apply to other EV charging applications, such as for charging of EVs such as electric motorcycles, electric bicycles, electric trucks, electric buses, electric aircraft, and the like.

Example Systems

Figure 1:
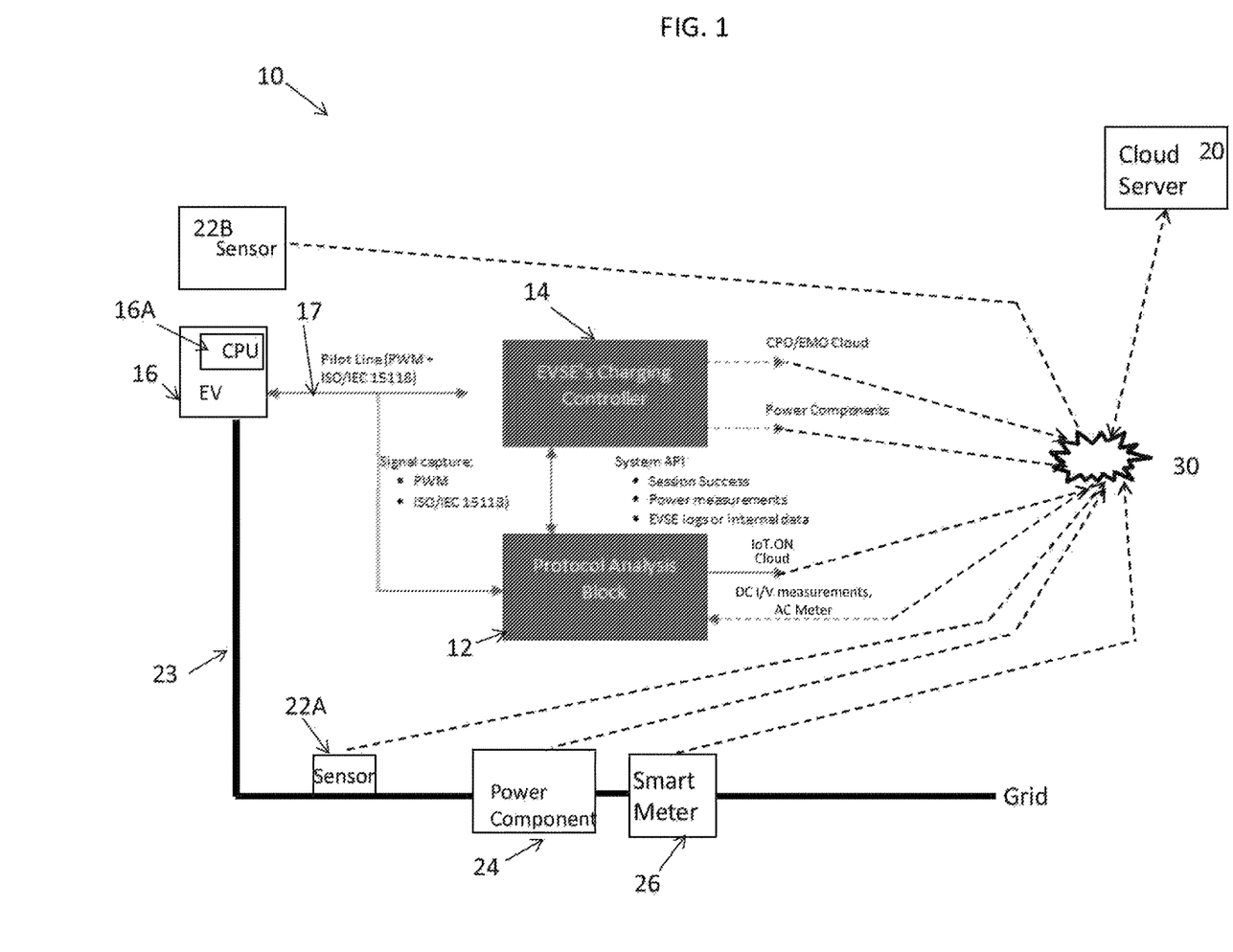
FIG. 1 is a block diagram of an exemplary charging control system, in accordance with aspects of the present disclosure.

FIG. 1 illustrates a block diagram of an exemplary EV charging system 10. The system 10 may include a protocol analysis controller 12, an Electric Vehicle Supply Equipment (EVSE) charging controller 14, an EV 16 and a Pilot line 17 communicatively coupling the EVSE charging controller 14 and the EV 16 to each other. The charging controller 14 may be communicatively coupled to a power supply component 24 of an EV charging apparatus 15 which also includes the controller 14 (see FIG. 3). The analysis controller 12 may be communicatively coupled to a cloud server 20, sensors 22A and 22B, and a smart AC meter 26 via a communication network 30 or other communication links.

The smart meter 26 may be an AC meter coupled via a local transformer and powerline customer premise distribution wiring (not shown) to the power supply component 24. The smart meter 26 may receive power from a power distribution Grid or an energy storage device via electric power wiring, and supply the received power to the power supply component 24.

The power supply component 24 may have a power interface for coupling to a power interface of EV 16 via a power cable 23. The power supply component 24 may supply power, under control of the charging controller 14, over the cable 23 to the EV 16.

The EV 16 may include a controller device 16A, such as a computer processing unit (CPU), that implements charging related operations, such as communicating with the charging controller 14 over the pilot line 17 to exchange information related to performing an EV charging session. In addition, the controller device 16A may control charging of a battery within the EV 16, using power supplied over the cable 23 and received at the power interface of the EV 16. In addition, the controller device 16A of the EV 16 may include a communication device (not shown) that allows for communication with another communication device via the communication network 30.

The sensor 22A may be a direct current (DC) current or voltage sensor coupled to the power line 23, and generate sensor information indicating current or voltage levels detected on the power line 23. In addition, the sensor 22A may include communication capabilities, and transmit, via the network 30 to the analysis controller 12, the sensor information, with time stamp information indicating times when the sensor information was detected on the power line 23.

The sensor 22B may be an environmental conditions sensor that detects temperature, wind speed, precipitation and other environmental conditions at the location of the sensor 22B. The sensor 22B may be positioned at or near the power component 24 or the EV 16. The sensor 22B may include communication capabilities and transmit, via the network 30 to the analysis controller 12, sensor information representative of the detected environmental conditions, with time stamp information indicating times when the environmental conditions are detected at the sensor 22B.

Figure 2:
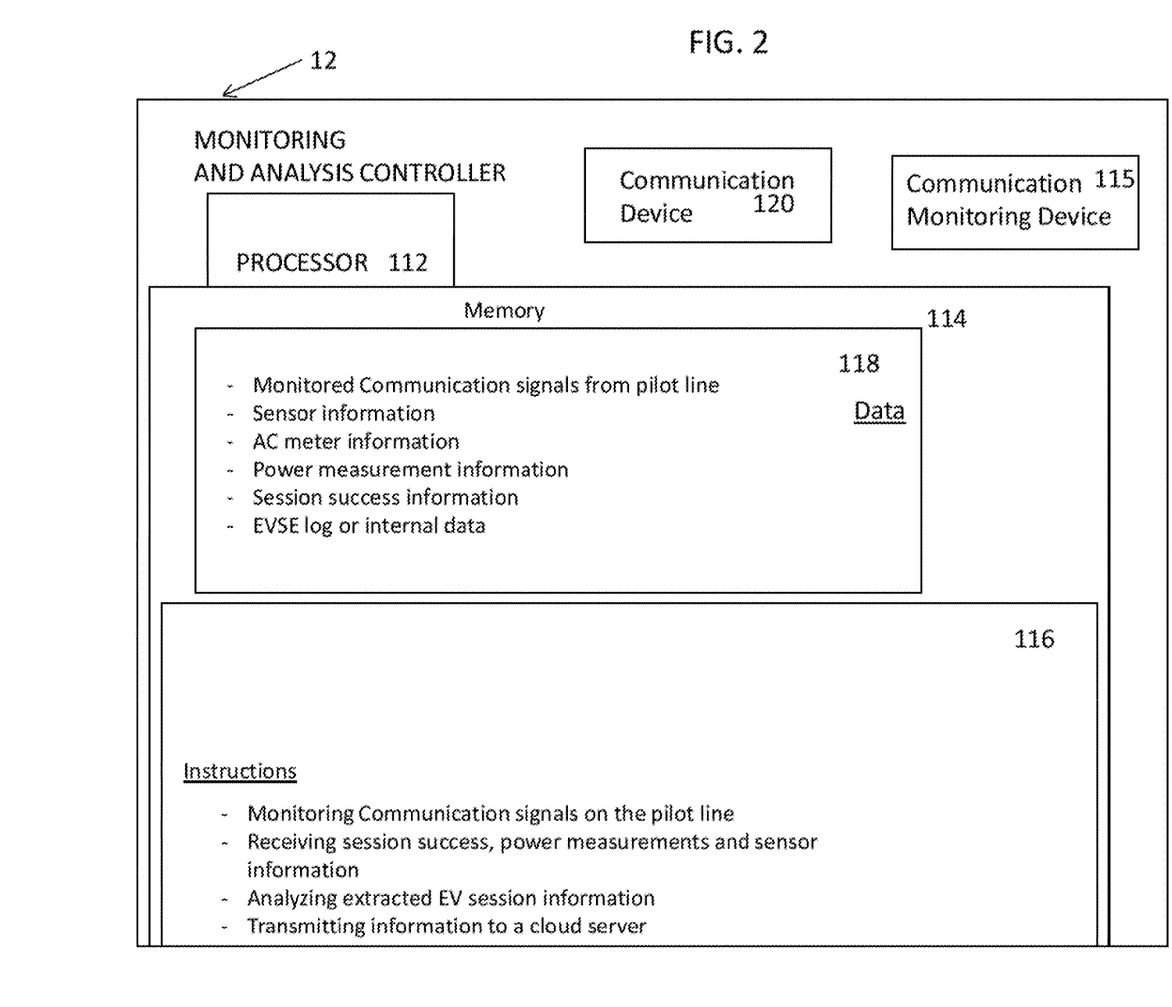
FIG. 2 is an illustration of a block diagram of an exemplary monitoring and analysis controller of FIG. 1, in accordance with aspects of the present disclosure.

FIG. 2 illustrates an exemplary embodiment of the analysis controller 12 of the system 10. The controller 12 may be in the form of a computing device that includes one or more processors 112, one or more memory 114, a communication signal monitoring device 115 and other components commonly found in computing devices.

The monitoring device 115 may be a device capable of passively monitoring communication signals on a communication line, such as the pilot line 17, and storing data representative of the monitored signals in memory 114. For example, the device 115 may monitor PWM and PLC communication signals on the pilot line 17 which are associated with an EV charging session and include Signal Level Attenuation Characterization (SLAC) messages and ISO/IEC 15118 communication signals. All EV charging session related signals monitored by the device 115 may be stored with a time stamp in the memory 114.

The memory 114 may store information accessible by the one or more processors 112, including instructions 116 that may be executed by the one or more processors 112. Memory 114 may also include data 118 that can be stored, manipulated, or retrieved by the processor. Such data 118 may also be used for executing the instructions 116 and/or for performing other functions. Such memory may be any type of non-transitory media readable by the one or more processors, such as a hard-drive, solid state hard-drive, memory card, ROM, RAM, DVD, CD-ROM, write-capable, read-only memories, etc.

The instructions 116 may be any set of instructions capable of being read and executed by the one or more processors 112. The instructions may be stored in a location separate from the computing device, such as in a network attached storage drive, or locally at the computing device. The terms "instructions," "functions," "application," "steps," and "programs" may be used interchangeably herein.

Data 118 may be stored, retrieved and/or modified by the one or more processors 112 in accordance with the instructions 116. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the controller 12 may include a communication device 120 configured to provide wired or wireless communication capabilities. The one or more processors 112 may be any type of processor, or more than one type of processor. For example, the one or more processors 112 may be CPUs from Intel, AMD, and Apple, or application specific integrated circuits (ASIC) or system on chips (SoCs).

FIG. 2 illustrates the components of the controller 12 as being single components, however, the components may actually comprise multiple processors, computers, computing devices, or memories that may or may not be stored within the same physical housing. For example, the memory may be a hard drive or other storage media located in housings different from that of the controller 12. Accordingly, references to a processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel. For example, in one embodiment, functions performed by the controller 12 as described below may at least be partially performed at one of the charging controller 14 or a remote server, such as cloud server 20. In another embodiment, functions described in this disclosure as performed at the analysis controller 12 may at least be partially performed at a smart phone or tablet, such as by execution of an app stored therein. In one embodiment, functions described herein as performed by the controller 12, may be distributed among one or more computing devices (servers) that operate as a cloud system that controls capturing EV charging communication signals and analyzing EV charging session information extracted from the captured signals, when a predetermined condition is satisfied, such as an EV charging session is determined to be not successful.

Referring to FIG. 2, the controller 12 may be configured to provide specific functions in accordance with embodiments of the present disclosure, and in some embodiments may be programmed with programs to perform some or all of the operations described herein.

The instructions 116 may include controlling monitoring of signals on the pilot line, storing data representative of the monitored signals, acquiring data from the controller 14 including charging session success information, receiving power measurement information from the controller 14 indicating power measurements performed at the apparatus 15 during a EV charging session, such as voltage or current levels of power supplied for charging the EV from the power component 24 over time, and receiving other EV power supply related data, such as EV logs or internal data, from the apparatus 15. In addition, the instructions 116 may include controlling receiving sensor information from sensors 22A and 22B, and power supply and consumption information from the smart meter 26. Further, the instructions 116 may include transmitting to the cloud server 20, via the communication network 30, the monitored signals information, the EV charging information extracted from the monitored signals, and results from analysis of the extracted EV charging information.

Figure 3:
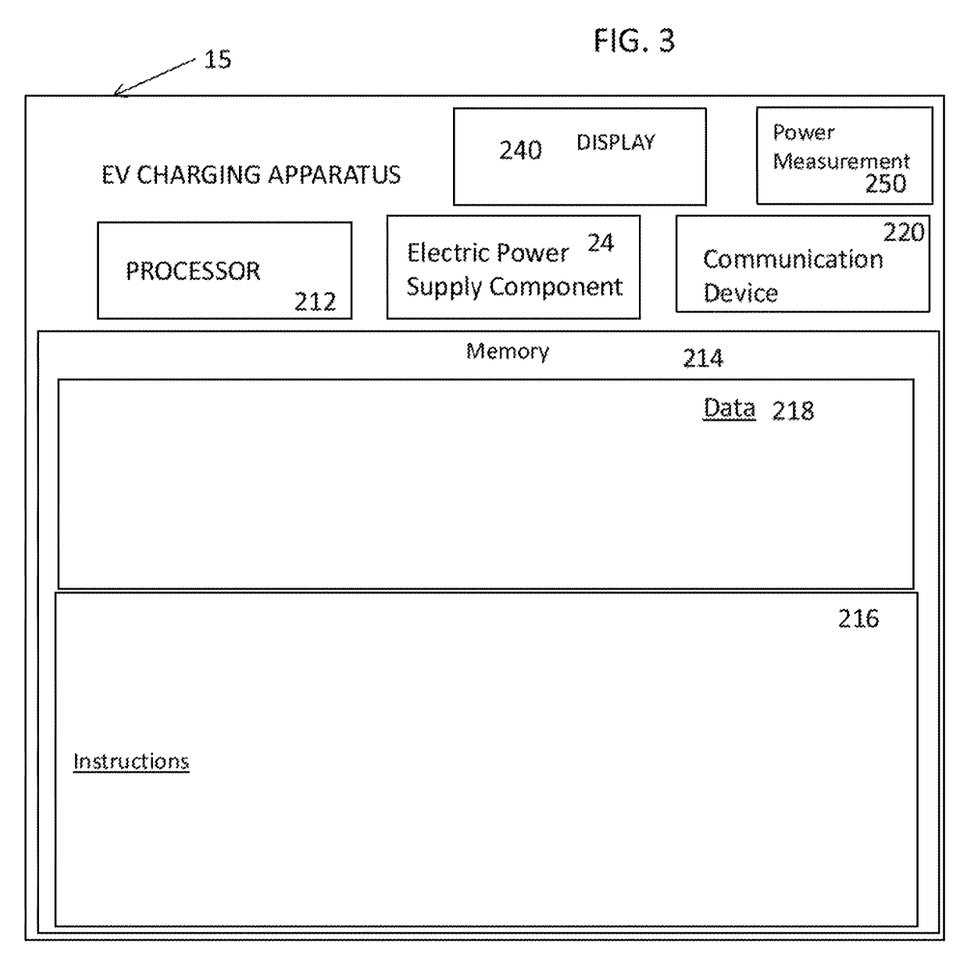
FIG. 3 is an illustration of a block diagram of an exemplary EV charging apparatus of FIG. 1, in accordance with aspects of the present disclosure.

FIG. 3 illustrates an exemplary embodiment of an EV charging apparatus 15. The apparatus 15 may include a component that is in the form of a computing device which includes one or more processors 212, one or more memory 214, and other components commonly found in computing devices. For ease of reference, the computing device of an EV charging apparatus is referred to herein as "charging controller." The apparatus 15 may be a personal computing device, such as intended for use by a user, and have all of the components normally used in connection with a personal computing device such as a central processing unit (CPU), memory (e.g., RAM and internal hard drives) storing data and instructions.

The memory 214 may store information accessible by the one or more processors 212, including instructions 216 that may be executed by the one or more processors 212. Memory may also include data 218 that can be stored, manipulated, or retrieved by the processor. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the apparatus 15 may include a communication device 220 configured to provide wired or wireless communication capabilities. The one or more processors 212 may be any type of processor, or more than one type of processor. For example, the one or more processors 212 may be CPUs from Intel, AMD, and Apple, or application specific integrated circuits (ASIC) or system on chips (SoCs).

The EV charging apparatus 15 may be configured to provide specific functions in accordance with embodiments of the present disclosure, and in some embodiments may be programmed with programs to perform some or all of the operations described herein. In one embodiment, the processor 212 may generate a session success indication when an EV charging session with an EV is determined to be completed, and output the session success indication to a remote device, such as the controller 12, over a communication link, such as the network 30.

Further, the apparatus 15 may include the electric power supply component 24, a display 240 and a power measurement device 250, each controllable by the processor 212. The electric power supply apparatus 24 may include electrical power components for supplying electrical energy, from an electric power source, to the EV via electric power cable 23. The sources of electric power may include alternative energy or renewable power resources, or a storage system that stores energy which may be used to output electrical power.

The display 240 may be a monitor having a screen, a touch-screen, a projector, a television, or other device that is operable to display information.

The power measurement device 250 may measure power supplied from the power supply component 24 to an EV during an EV charging session, and store in memory 214 data representative of such power measurements with a time stamp indicating when the measurements were performed.

In addition, the apparatus 14 may include (not shown) a user input device (e.g., a mouse, keyboard, or microphone).

Referring to FIG. 1, the communication network 30 may be a wired, wireless or powerline communication network, or combination of such networks, that communicatively couples the components of the system to the Internet or another communication network, such as a cloud communication network. In one embodiment, the communication network 30 may include interconnected protocols and systems. For example, the network may be implemented via the Internet, intranets, local area networks (LAN), wide area networks (WAN), etc. Communication protocols such as Ethernet, Wi-Fi, and HTTP, Bluetooth, LTE, 3G, 4G, Edge, etc., power line communication networks, such as HOME-PLUG and the like, and various combinations of the foregoing may be used to allow nodes to communicate.

In accordance with aspects of the present disclosure, the controller 12 may control passive monitoring of communication signals on the pilot line 17 related to a EV charging session for charging EV 16 by the EV charging apparatus 15, and analyzing EV charging session information extracted from the monitored signals to determine a cause of a marginal operating condition or a failure condition during an EV charging session, and generate an output, based on the result of the analyzing, to cause a change to operational conditions of the EV or EV charging apparatus relating to an EV charging session.

Example Methods

For purposes of illustrating the features of the present disclosure, an exemplary process for monitoring communications signals related to an EV charging session, analyzing EV charging session information extracted from the monitored signals to determine a cause of a marginal operating condition or a failure condition for an EV charging session and, based on the result of the analysis, generating an output to control EV charging operations at an EV controller or EV, is described below in connection with operations performed at components of the analysis controller 12 and the components in the system 10 as shown in FIG. 1.

Figure 4:
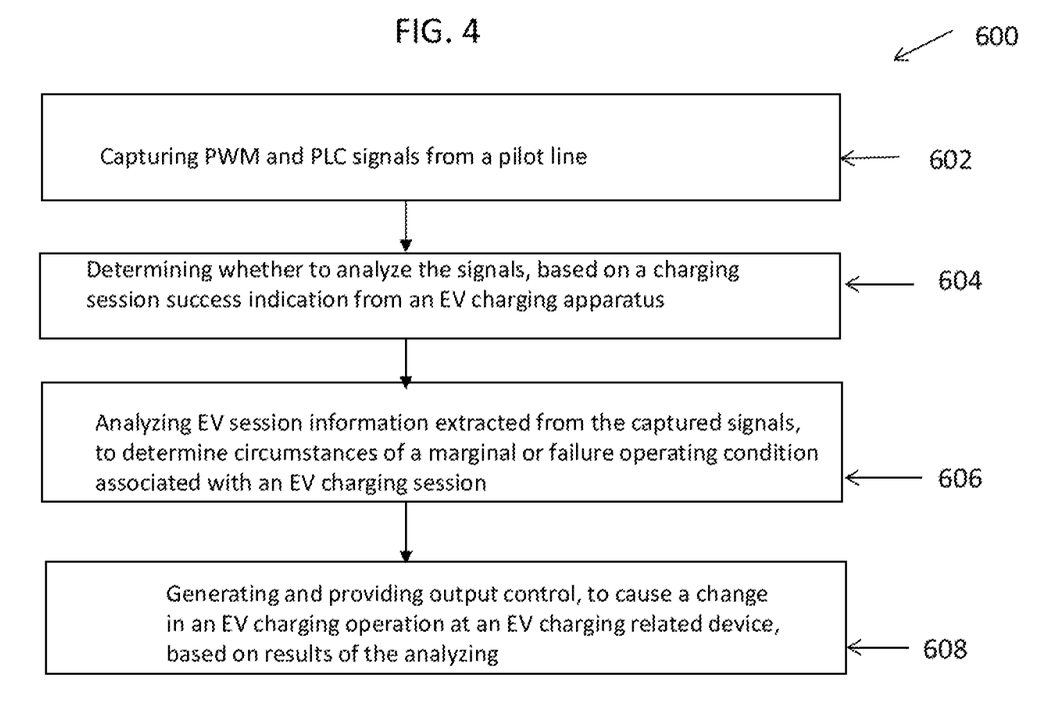
FIG. 4 is an exemplary high level flow diagram of a method for monitoring signals during an EV charging session and analyzing EV session charging information extracted from the monitored signals, to generate and provide an output related to control of EV charging operations, in accordance with aspects of the present disclosure.

Referring to FIG. 4, a high-level block diagram 600 of a method for passively monitoring communication signals related to an EV charging session and generating an output based on analysis of the EV charging information extracted from the monitored communication signals is illustrated. Although the method of flow diagram 600 as described below identifies specific functions performed by the analysis controller 12, it is to be understood that, in accordance with aspects of the present disclosure, the functions of the controller 12 may be distributed among several servers/computing devices, which together form a cloud control system that may perform any or all functions of the disclosure.

In block 602, the controller 12 may control continuous and automatic passive capture of communication signals, such as PLC or PWM signals, conveyed over the pilot line 17 between the charging controller 14 and the EV 16, where the signals are associated with an EV charging session for charging the EV 16 using power supplied from the power component 24 under control of the controller 14. The controller 12 may control storing the captured signals with a timestamp in memory 114.

Also, in block 602 the controller 12 may control communication with the controller 14 to provide for receiving or acquiring EV charging session success indication information, power measurement information and other log or internal data from the EV apparatus 15. The controller 12 may store any information received or acquired from the controller 14 in the memory 114. In one embodiment, the controller 14 may receive from the controller 12 decryption information, such as transport layer security TLS ephemeral keys, necessary for decoding the communication signals which are monitored on the pilot line 17, Further, in block 602, the controller 12 may control receiving sensor information generated at the sensors 22A and 22B, and power measurement information collected at the smart meter 26, and control storing, in the memory 114, data representative of the received sensor information and power measurement information. As discussed above, the sensor information may be from a direct current (DC) current or voltage sensor coupled to a power line on which power is supplied from an EV charging apparatus to an EV. The sensor information and the power measurement information may provide a backup for DC current and power measurements that are performed at an EV charger apparatus or EV. In one embodiment, the sensor information may include DC current and power measurements, and be used, for example, to verify latencies related to exchange of communication packets between the EV and controller 14 during an EV charging session, where the communication packets concern protocol specific communication signal exchanges required to implement an EV charging session between an EV and an EV charging apparatus.

In one embodiment, the controller 12 may use the power measurement information from the smart meter 26 to track actual AC power consumption and determine overall power usage efficiency of an EV charging session.

In block 604, the controller 12 may determine whether analysis of the monitored signals is to be performed, based on the charging session success information received from the controller 14. For example, when the charging session success information indicates an EV charging session was successfully completed, the controller 12 may discard from the memory 14 all monitored signal information stored which is associated with the successfully completed charging session. When the charging session success information indicates an EV charging session was not successfully completed, or when a user input requests evaluation of the monitored signals for an EV charging session regardless of whether the EV charging session is determined to be successful, the controller 12 may store the monitored signal information in the memory 14 and proceed to block 606.

In block 606, the controller 12 may control extracting EV session related information, such as EV session related communication packets of various layers of the Open System Interconnection Model (OSI Model) included in the monitored signals. Further, in block 606 the controller 12 may control analyzing the extracted communication information to determine whether the extracted information indicates a marginal operating condition or a failure condition occurred in the course of the communication of signals on the pilot line 17 during an EV charging session.

As the communication signals are captured at the Physical Layer by the controller 12 during an EV charging session, the information extracted from the captured signals may be used to provide a better and more detailed view of communication information in the communication layer. For example, the signals monitored from the pilot line may include voltage, frequency or duty cycle information, and the analysis may rely upon and use such information to identify the existence of communication conditions which are associated with a marginal operating condition or a failure condition. In one embodiment, the monitored signals may indicate PLC Receive and Transmit per-carrier signal amplitude and noise measurements, and PLC Transmission/Reception status.

In one embodiment, the analysis by the controller 12 may include analyzing each PLC packet, as indicated in the monitored signals, and tracing its progression along the communication path, in order words, along the line 17, to determine whether the PLC packet was successfully transmitted by one PLC modem at a first EV charging related device, such as EV charging apparatus, and received by another PLC modem at a second EV charging related device, such as an EV being charged.

In one embodiment, EV session related communication information extracted from the signals may include PLC retransmission attempts. The analysis of such communication information indicating retransmission attempts may help to identify whether a marginal communication link exists. For example, a marginally operable communication link may be determined to be present where a predetermined number of retransmission attempts are performed before a specific protocol exchange of a response transmission which is responsive to a request message for an EV charging session is successfully completed.

In block 608, the controller 12 may generate an output based on results of the analysis in block 606. For example, where a determination is made in block 606 that a marginal communication condition exists, the output may include information concerning the circumstances related to marginal condition, such that an EV charging operation related to the circumstance may be addressed. In one embodiment, for example, the controller 12 may generate an output, when a marginal communication link is identified, to be transmitted over the network 30 to the EV charging controller 14, to cause the controller 14 to use a different communication medium than previously used, e.g., wired instead of wireless, or a different wireless frequency channel, to perform communication with an EV during an EV charging session. Advantageously, the controller 12 may detect such marginal operating condition from the monitored signals, such that the cause may be remedied, and where the cause of the marginal operating condition is otherwise not detectable within the EV or EVSE controller itself.

In one embodiment, the analysis controller in block 606 may automatically determine if there are any problems with an EV charging session, even when an EV charge session failure does not exist.

In one embodiment, the EV charging session communication information extracted from the monitored signals may indicate whether an EV charge session is interrupted at any point, such as prior to a high-level communication being established as part of initiating an EV charging session. When an interruption is determined, the controller 12 may cause automatic storing of the EV charging session communication information for further analysis in the memory 114, or transmitting the EV charging session communication information to the server 20 over the network 30 for further analysis by the server 20 with other related communication information obtained from monitoring communication signals during an EV charging session.

In one embodiment, the EV charging session related information analyzed in block 606 may be from sensor information generated at an external measurement sensor external to the controller and an EV charging apparatus, and which may be communicatively coupled with the controller.

In one embodiment, the controller 12, when analyzing the information extracted from the monitored signals, may also analyze sensor information generated at a sensor and indicating the DC current and power measurements, to verify reporting latencies regarding communication of messages related to initiating and maintaining an EV charging session.

Advantageously, the present disclosure may provide for independent, passive recording of EV charging system stimulus, which results in data capture of relevant EV charging related information without interfering with normal system operation of an EV charging system. The passive monitoring of signals, from which EV charging session information may be obtained, avoids the need to add additional instrumentation to collect the information which may adversely impact communications flow and measurement of EV charging related information, for example, by causing communications not to be received at a EV related charging device, such as EVSE charging apparatus, in accordance with timing requirements of a communication protocol established for EV charging session related communications.

In one embodiment, analysis of EV charging information related to an entire EV charging session may be performed remotely, such as at a cloud server to which the analysis controller provides information representing the monitored signals or EV charging session information extracted from the monitoring signals.

In one embodiment, the analysis controller may be included in a charging controller of an EV charging apparatus, or communicatively coupled to and external an EV charging apparatus.

In one exemplary implementation of the present disclosure, when the session success indication indicates an EV charging session is not successful, the analysis controller may analyze the EV charging session information extracted from the monitored to signals to determine, for example, whether the packets indicate a required communication handshake was established between the EV and the EV charging controller, and also whether the handshake which was established was concluded.

In addition, the analysis controller may analyze the EV charging session information to determine, from evaluation of exchange of request packets and response packets to the request packets between the EV and EV charging controller, the circumstances of an EV charging session which is initiated but aborted before completion. For example, the analysis controller may find that a specific request packet transmitted at a specific elapsed time from the EV charging controller during the charging session is not responded to by the EV, and also determine from the monitored signals that a noise level of the monitored signals was above a certain threshold at about the same time as the elapsed time. The result of this analysis may be output to an operator of the EV charging apparatus, for use in determining whether the noise was arbitrary or due to a hard or soft failure of components of the EV charging apparatus or related EV charging components.

In a further exemplary implementation, the analysis controller may analyze the EV charging session information to determine that a trend or pattern exists which is associated with successful or unsuccessful EV charging by an EV charging apparatus. For example, the analysis may determine that the EV charging apparatus, which has a timeout for receiving a packet responsive to a request packet of a first value, e.g., 10 msec, receives the response packet within the timeout interval for first types of EVs, such that the EV charging session continues and is successfully completed for the first types of EVs, whereas the response packet is not received within the timeout for second types of EVs although the response packet is actually sent by the second types of EVs, such that the EV charging session is never initiated by the EV charging apparatus for the second types of EVs. The analysis controller may provide an output to an administrator of the EV charging apparatus, where the output indicates the result of the analysis and in particular the timing information of the response packets which are sent by the second types of EVs but not received at the EV charging apparatus within the timeout period, such that the timeout may be adjusted. For example, the output may include analysis results that indicate that increasing the timeout period by 1 msec to 11 msec, at the EV charging apparatus, would provide that the response packets from the second types of EVs would be received within a timeout period for response set at the EV charging apparatus, which would in turn provide that the EV charging session may be initiated and successfully completed for the second types of EVs. In the example, the length of the timeout interval is not crucial to other EV charging sessions operations, such that increasing the timeout interval slightly may remedy the failure condition related to EV charging, without impacting other EV charging session operations.

In a further embodiment, the analysis controller may analyze the EV charging session information to determine that only a portion of a packet transmitted from the EV exists, and that the physical layer information extracted from the monitored signals indicates that a high noise level is associated with the portion of the packet which is determined not to exist. An output indicating the result of the analysis may be used to determine the source of the noise, which may be a faulty or damaged power cable 23, such that the fault may be repaired.

Advantageously, the present disclosure permits time-based analysis of communication information extracted from the monitored signals to identify parameters that may not be readily ascertainable during lab testing. The parameters may vary slightly or change substantially when the EV charging equipment is operated in an installation condition in which environmental conditions such as temperature and moisture, power cable specifications such as voltage and current ratings, and the like may impact successful exchange of communication signals between the EV and EVSE apparatus according to a predetermined communication protocol for an EV charging session between the EV and EV apparatus.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method implemented on a processing device for controlling an electric vehicle (EV) charging operation, the method comprising:
capturing, from a pilot line communicatively linking a given EV with an EV charging apparatus, at least one signal of a pulse width modulated (PWM) signal or power line communication (PLC) signal indicating EV charging session information associated with charging the given EV by the EV charging apparatus;
determining, from session success information from a controller of the EV charging apparatus, whether to analyze the EV charging session information; and
when the session success information is determined to not indicate successful completion of an EV charging session,
extracting the EV charging session information from the at least one signal according to an Internet protocol layer, and
analyzing the extracted EV charging session information to determine a marginal operating condition or a failure condition associated with the EV charging session.

2. The method of claim 1, further comprising providing an EV charging operation control output to a given EV charging device, to cause a change in operation of the given EV charging device during a given EV charging session.

3. The method of claim 2, wherein the given EV charging device is the given EV or the EV charging apparatus.

4. The method of claim 2, wherein the change in operation relates to a communication protocol used for transmission and reception of communication signals including given EV charging session information at the given EV charging device or the EV.

5. The method of claim 1, wherein the EV charging apparatus includes the processing device.

6. The method of claim 1, wherein the processing device is of another apparatus configured to be communicatively coupled to (i) a charging controller of the EV charging apparatus and (ii) a communication link communicatively linking the EV charging apparatus and the given EV.

7. The method of claim 1, wherein the at least one signal includes at least one of a Signal Level Attenuation Characterization (SLAC) message or an ISO/IEC 15118 message compliant to at least one version of a ISO/IEC 15118 standard.

8. The method of claim 1, further comprising:
acquiring given EV charging session related information from at least one sensor generating sensor information related to EV charging.

9. The method of claim 8, wherein the at least one sensor is a DC current or voltage sensor, or an AC current or voltage sensor at an AC power meter.

10. The method of claim 1, wherein, when the session success information is determined to indicate unsuccessful completion, the method further comprises storing the extracted EV charging session information in a memory.

11. The method of claim 1, wherein the analyzing includes determining, from the extracted EV charging session information, at least one of whether (i) a communication handshake is established between the EV charging apparatus and the given EV, (ii) a communication link between the EV charging apparatus and the given EV is concluded, or (iii) a given response is sent from one of the EV charging apparatus and the given EV responsive to a given request sent from the other the EV charging apparatus and the given EV.

12. The method of claim 1, wherein the extracting and the analyzing are performed in a case when the session success information is determined to indicate successful completion of an EV charging session.

13. A processing device for controlling an electric vehicle (EV) charging operation, the processing device comprising:
at least one processor;
a communication device communicatively coupled with the at least one processor and
a communication signal monitoring device communicatively coupled with the at least one processor, wherein the at least one processor is configured for:
capturing, from a pilot line communicatively linking a given EV with an EV charging apparatus, at least one signal of a pulse width modulated (PWM) signal or power line communication (PLC) signal indicating EV charging session information associated with charging the given EV by the EV charging apparatus;
determining, from session success information from a controller of the EV charging apparatus, whether to analyze the EV charging session information; and
when the session success information is determined to not indicate successful completion of an EV charging session,
extracting the EV charging session information from the at least one signal according to an Internet protocol layer, and
analyzing the extracted EV charging session information to determine a marginal operating condition or a failure condition associated with the n EV charging session.

14. A non-transitory computer readable medium comprising a plurality of machine-readable instructions which when executed by one or more processors of a processing device are adapted to cause the processing device to perform a method for controlling an electric vehicle (EV) charging operation, the method comprising:
capturing, from a pilot line communicatively linking a given EV with an EV charging apparatus, at least one signal of a pulse width modulated (PWM) signal or power line communication (PLC) signal indicating EV charging session information associated with charging the given EV by the EV charging apparatus;
determining, from session success information from a controller of the EV charging apparatus, whether to analyze the EV charging session information; and
when the session success information is determined to not indicate successful completion of an EV charging session,
extracting the EV charging session information from the at least one signal according to an Internet protocol layer, and analyzing the extracted EV charging session information to determine a marginal operating condition or a failure condition associated with the EV charging session.

* * * * *